Dec. 20, 1960  D. G. JOCZ  2,965,008
APPARATUS FOR MACHINING CYLINDRICAL OBJECTS
Filed July 15, 1957  4 Sheets-Sheet 1
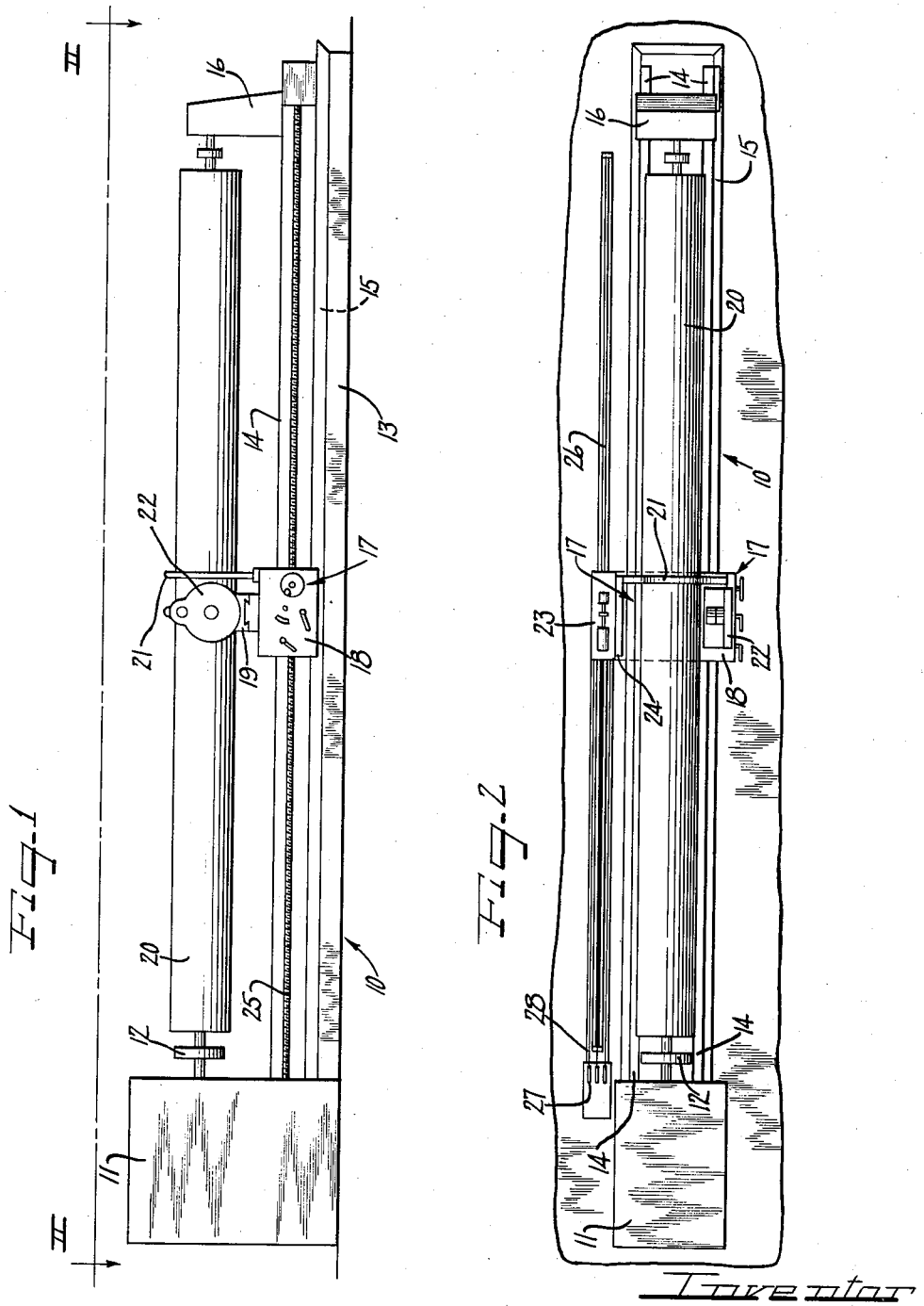
Inventor
Daniel G. Jocz Dec. 20, 1960 D. G. JOCZ 2,965,008
APPARATUS FOR MACHINING CYLINDRICAL OBJECTS
Filed July 15, 1957 4 Sheets-Sheet 2

Inventor
Daniel G. Jocz
Attys

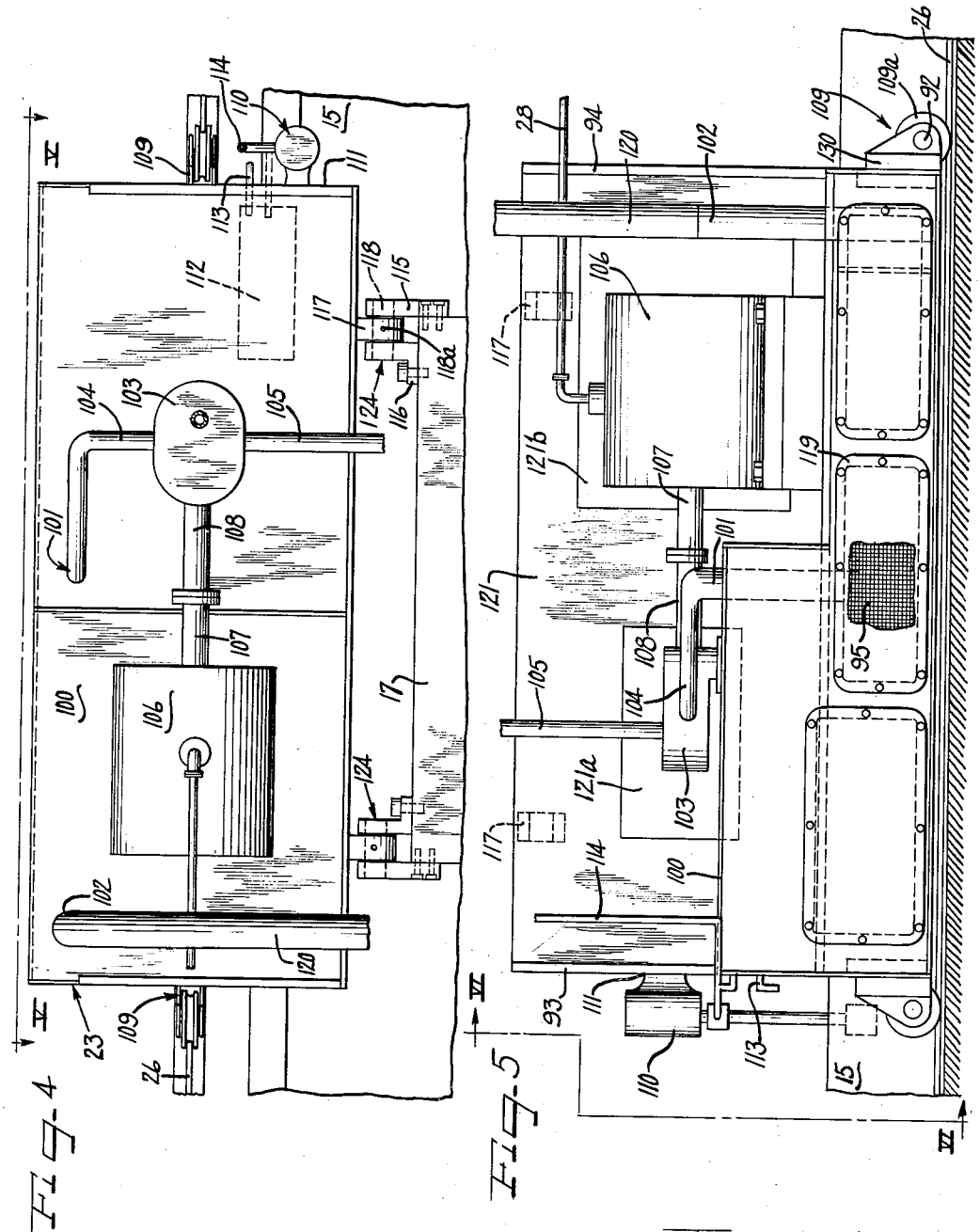

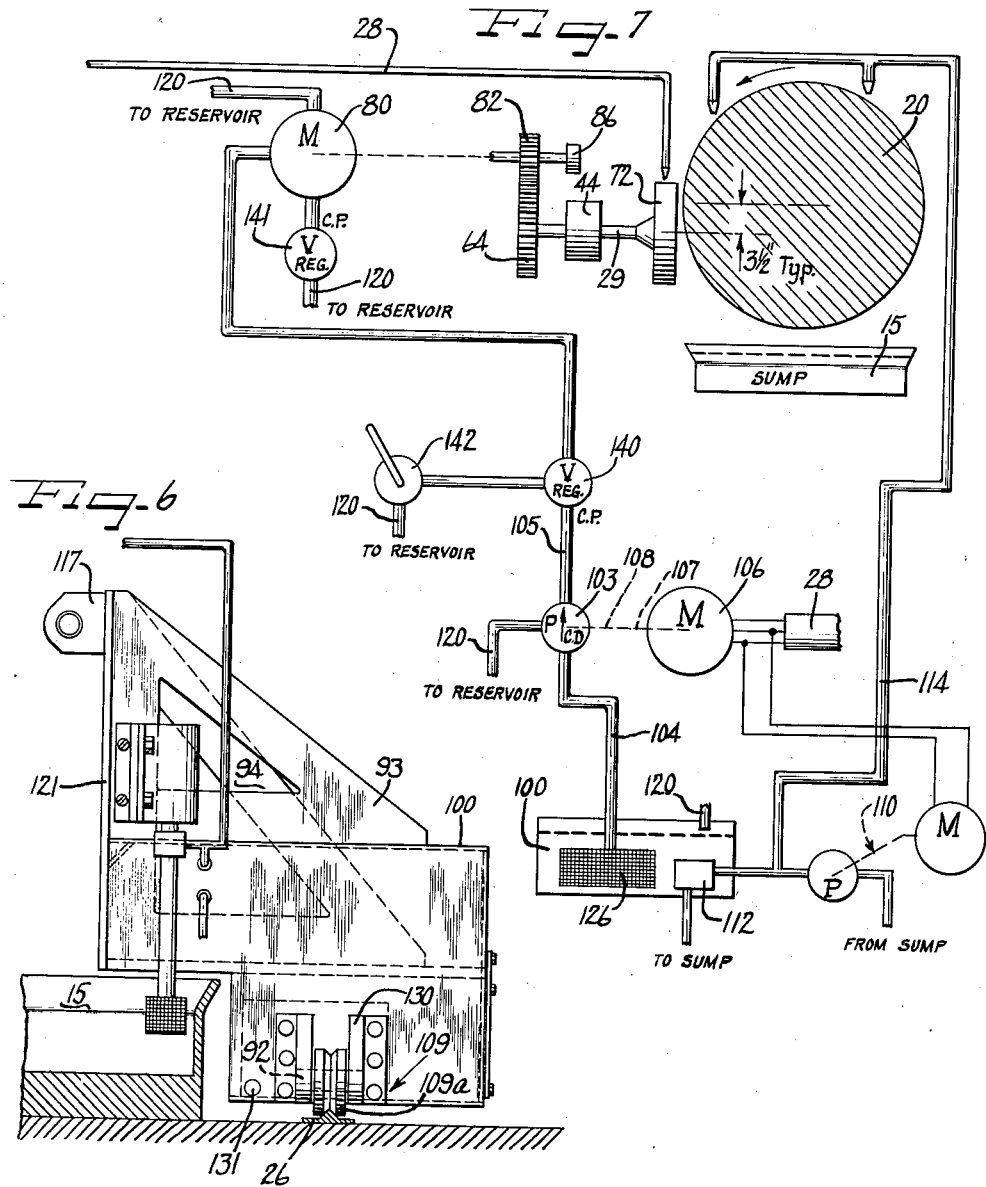

United States Patent Office 2,965,008
Patented Dec. 20, 1960

2,965,008

APPARATUS FOR MACHINING CYLINDRICAL OBJECTS

Daniel G. Jocz, Beloit, Wis., assignor to Beloit Iron Works, Beloit, Wis., a corporation of Wisconsin Filed July 15, 1957, Ser. No. 671,991

5 Claims. (Cl. 90—15)

This invention relates generally to lathes, and more specifically to an improved heavy duty lathe incorporating a rotatably driven cutter therein.

Although the principles of the present invention may be included in various lathes or similar machine tools, a particularly useful application is made in lathes of the larger heavy duty sizes used to machine relatively large cylindrical devices.

In particular, when the outside surface of a cylindrical object is to be machined smooth, a relatively long period of time has been required heretofore to perform this operation, even though a large lathe be used and it be operated at its maximum capacity. Such lathes transmit power from their motor, through a gear train, to the headstock, through the workpiece, to a stationary cutter. To increase the power available at the cutter, it was necessary heretofore to redesign the entire lathe providing accordingly heavier components throughout. Furthermore, when relatively long objects are machined, it has been necessary heretofore to use a steady rest near the center of the workpiece to prevent the workpiece from bowing under the reactive force of the cutting tool. When such a device is used, it becomes necessary to machine the object by taking a cutting pass from each end, moving the steady rest after the first pass has been made. Invariably, an imperfect joint results, a step of .020–.030 inch not being uncommon.

Furthermore, the lathes heretofore have typically produced a finish of the cut which was of such coarseness as to require further machining to produce the required surface finish.

Furthermore, when heretofore known lathes were operated at full capacity, they have generated a substantial amount of heat in the workpiece, such heat typically causing a stress relief which in turn produced warping of the part, thereby necessitating a subsequent straightening operation for the object. While carriages of such lathes have typically included a coolant pump system which removes coolant from the sump and forces it against the workpiece to keep it cool, it has been impractical to increase the size of the pump and hence the cooling capacity since such increase in size would place an undue weight on the carriage and therefore on the ways, thereby producing imperfect work due to variation in lathe distortion.

The present invention contemplates the utilization of a rotatable milling cutter of the facing type which is rotatably mounted on the cross slide of the lathe carriage. Rotational power is applied directly to the cutting tool, and where such power is relatively high, such as in a heavy duty lathe, a hydraulic motor is preferably employed to deliver such power. A source of hydraulic power is also included adjacent to the lathe, which source of power is preferably translatably carried on a way or track disposed adjacently to the path in which the carriage moves. The source of hydraulic power is operatively connected to the hydraulic motor, and is mechanically connected to the carriage for horizontal translation thereby. The invention also includes other structural features for effecting the foregoing.

Thus the invention contemplates the rotation of a workpiece in a lathe, the power for doing this rotation coming from the lathe motor. During such rotation, power is delivered from a second rotational source connected to the cutter which is a milling type cutter in engagement with the workpiece. Also, the carriage of the lathe is advanced by the lathe lead screw at a rate which determinees the width of cut taken.

Accordingly, it is an object of the present invention to provide an improved heavy duty lathe.

Another object of the present invention is to provide an improved lathe wherein cutting power is transmitted directly through a cutter, and not primarily through the rotating workpiece held by the lathe.

Yet another object of the present invention is to provide a method for taking a machining cut more efficiently than has heretofore been done.

A further object of the instant invention is the provision of a translatable power supply for a lathe cutter.

Still another object of the present invention is elimination of the need for a steady rest at the center of an elongated workpiece, whereby a cut may be taken in a single pass, thereby avoiding an imperfect juncture of cuts.

A still further object of the present invention is the provision of a method and means for machining cylindrical devices wherein an improved surface finish is obtained.

A still further object of the present invention is the provision of a more efficient method and means for taking machining cuts, whereby less heat is created in the workpiece so that any ensuing stress relief and subsequent need for straightening of the workpiece is eliminated.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

Figure 1 is an outline view of a heavy duty lathe equipped with a cutter provided in accordance with the principles of the present invention;

Figure 2 is a view taken along line II—II of Figure 1 showing a top view of the lathe;

Figure 4 is an enlarged view of a portion of Figure 2, showing the arrangement of the hydraulic power supply;

Figure 5 is an elevational view taken along line V—V of Figure 4;

Figure 6 is an end view taken along lines VI—VI of Figure 5; and

Figure 7 is a schematic diagram directed primarily to the hydraulic circuitry of this invention.

As shown in the drawings:

Figure 3:
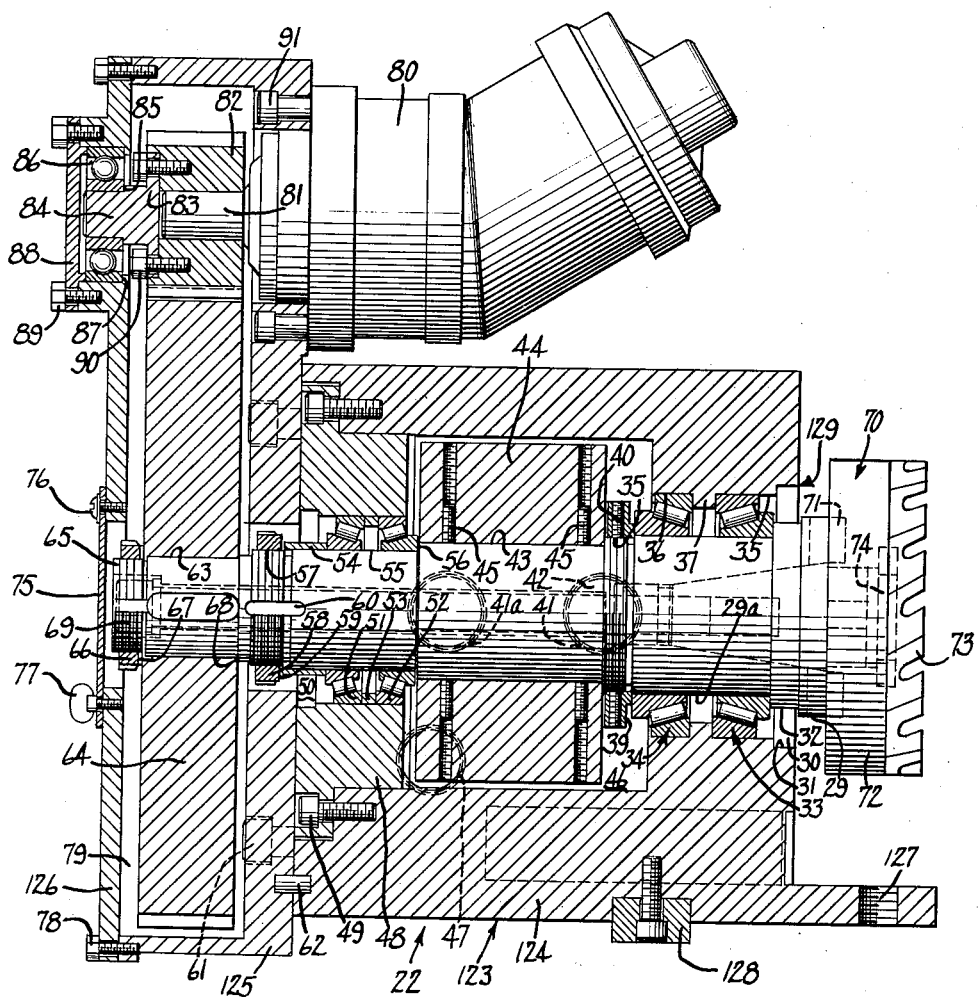
Figure 3 is an enlarged cross sectional view of the structure used to rotatably mount the cutter on the cross slide of the lathe.

The principles of this invention are particularly useful when embodied in a heavy duty lathe such as illustrated in Figure 1 generally indicated by the numeral 10. The lathe 10 includes a motor and gear box 11, a driving chuck or part 12 connected to the head stock, a bed 13 supporting one or more horizontal ways 14 which are elongated and stationary, an open coolant sump 15 coextensive with the horizontal ways, and a tailstock 16. It further includes a horizontally movable carriage 17 having an apron 18 movably supported by the ways 14 and a cross slide 19 carried by the apron and which is movable transversely to the motion of the carriage 17. An elongated workpiece 20 is supported and rotated between the head stock 12 and the tail stock 16 and is driven rotatably by the lathe. A follow rest 21 is also carried by the carriage 17 and which spans the workpiece 20.

A hydraulically driven cutter assembly 22 is supported by the cross-slide 19 by which it is movable toward and away from the workpiece 20, the cutter assembly 22 being translatable along the length of the workpiece 20 by the carriage 17.

Referring now to Figure 2, the lathe 10 further includes a second source of power, preferably a hydraulic source of rotational power 23 drivingly connected to the carriage as by a pivotal connection 24, so that the carriage 17, when advanced by a lead screw 25 (shown in Figure 1), may translate or advance the source of power 23 along the length of the workpiece 20. The second source of power 23 is supported on a track or way 26 which is preferably supported independently of the bed 13, for example by the floor of the room. At either end of the track 26, there is provided one or more cord reels 27, each having an appropriate means or cable 28 extending from the cord reel to the source of power 23. The cables 28 are used to provide electric and power control to the source of power 23, and lubrication to the carriage 17 generally and to the cutter assembly 22 thereon.

While relatively light weight sources of power may be carried directly on the cross slide, I have found that when it is desired to provide a relatively large amount of power to the cutter assembly, the weight of such power supply becomes prohibitive. Thus, by way of example, a lathe having a 15 horsepower motor arranged to rotate the workpiece, may also be provided with a second source of power, for example one of 15 to 50 horsepower, the weight of which is nearly entirely supported independently of the bed of the lathe.

Referring now to Figure 3, there is shown an enlarged sectional view of the hydraulically driven cutter assembly 22. The assembly 22 includes a housing generally indicated at 123 which comprises a base 124, a gear case 125, and a bearing supporting cover 126. The base 124 includes a plurality of apertures 127 through each of which may extend a screw for securing the assembly to the cross slide 19. The base 124 also has a swivel plug 128 about which the assembly 22 may be pivoted to align it squarely with the workpiece 20. The base 124 has a stepped circular bore 129 through which extends a rotatable spindle 29. The spindle 29 has a plurality of steps or diameters concentric with each other on which are carried various components. An oil seal 30 is received within a counterbore 31 at one end of the bore 129 and on a large diametral portion 32 of the spindle 29. This seal prevents the entry of workpiece or cutter coolant into the interior of the bore. The oil seal 30 also prevents lubricant which is in the cutter assembly 22 from leaking out along the spindle 29. A pair of oppositely directed thrust bearing assemblies 33 and 34 are carried on a portion 29a of the spindle 29 having a slightly reduced diameter. The cups of the bearing assemblies 33 and 34 engage with the bore 129 of the base 24 at a portion 35 and 36 respectively having slightly reduced diameters. Intermediate the portions 35 and 36, there is an annular shoulder 37 against the opposite sides of which the cups of the bearing assemblies 33 and 34 bear. Adjacent to the portion 29a of the spindle 29, there is a threaded portion 38 on which is received a threaded nut 39 which may be turned to draw the bearing assemblies 33 and 34 toward each other, and which preferably is positioned so as to place a predetermined thrust load on such bearing assemblies which bottom against the annular shoulder or portion 37. The nut 39 preferably includes a radial opening 40 in which is received a locking screw, the tightening of which fixes the pre-load on the bearing assemblies 33 and 34.

Access to the nut 39 may be had through an opening 41 in the base 124 which is normally closed by a plug 42. The nut 39 may be most easily adjusted by inserting a pin through the base opening 41 into the radial opening 40, or into a similar recess, in the nut 39. Then while such pin is held against rotation, manual rotation of the spindle 29 accomplishes the tightening or loosening of the nut 39.

On a reduced diametral portion 43 there is carried a flywheel 44 which is secured thereto as by set screws 45, access to which may be had through the opening 41 and a similar opening 41a. The flywheel 44 extends into an enlarged portion 46 of the case bore 129 which portion also serves as a chamber for receiving lubricant, such as through either opening 41 or 41a. A third opening 47 communicates with the lower portion of the chamber 46, the opening 47 being closed by a drain plug, or by a bearing lubrication sight gauge.

A bearing housing or plate 48 is received within the end of the bore in the base 124, and is secured to the base as by a plurality of screws 49. The bearing plate 48 has a bore concentrically disposed with the bore in the base 124 within which are received an oil seal 50, a pair of thrust bearing assemblies 51, 52, and a bearing spacer 53. An axial loading sleeve 54 is received in the center of the oil seal 50. The bearing assemblies 51 and 52 are oppositely directed with the bearing spacer 53 being positioned therebetween.

The spindle 29 has a diametral portion 55 of still further reduced diameter which defines a shoulder 56 against which the cone of the thrust bearing assembly 52 bears. Adjacent to the diametral portion 55 of the spindle 29, there is a threaded portion 57 on which is received a nut 58 and a lock washer 59. When the nut 58 is tightened, an axial thrust is produced between the threaded portion 57 and the shoulder 56, whereby the loading sleeve 54 displaces the bearing assemblies 51 and 52 within the bore of the bearing plate 48 so that they become axially preloaded with a slight force. Thus bearing lubricant in the chamber 46 may reach the bearing assemblies 51 and 52, but does not escape beyond the oil seal 50. If desired, a slot 60 may be provided in the spindle 29 for receiving a portion of the lock washer 59, to preclude any relative rotation therebetween.

The gear case 125 is secured to the base 124 such as by a plurality of screws 61, and the relationship between the gear case 125 and the base 124 may be controlled by the provision of one or more dowel pins 62 extending into each of these elements. The gear case 125 has an aperture within which the nut 58 is disposed and through which the spindle 29 projects.

The spindle 29 further includes a slotted portion 63 of still further reduced diameter onto which is received a keyed helical gear 64. The helical gear 64 is preferably made with as large an amount of its mass located near its periphery as is practicable so as to increase its angular momentum or flywheel effect. The extreme end of the spindle 29 is threaded as at 65 and receives a nut 66 and keyed lock washer 67. Tightening of the nut 66 draws the gear 64 against a shoulder 68 on the spindle 29 to secure the gear 64 securely thereon.

The spindle 29 is axially hollow and receives therein a drawbar 69 which threadably engages with a centering arbor 70 carried at the opposite end of the spindle 29. The arbor 70 has an integral key 71. A rotary milling cutter 72 having a plurality of cutters on its face 73, for example 12 cutting edges, is supported by the arbor 70 in engagement with the key 71 and is threadably secured thereto by a cap screw 74.

Thus it can be seen that the cutter 74 has a cutting face perpendicular to its rotational axis and that it is rotatably supported without end play for rotation.

The gear case 125 is closed by the bearing supporting cover 126 which has a pivotable cover 75 overlying an opening to the draw-bar 69. The cover 75 may be pivoted about a screw 76 and locked in place by a thumb screw 77 in a closed position. Thus the cover 75 may be pivoted to provide access to the drawbar 69 which has a hexagonal socket opening in its head, whereby the drawbar may be unscrewed so that the cutter may be removed from the unit 22. The cover 126 may be secured to the gear case 125 as by a plurality of cap screws 78. If desired, the relationship between these elements may be further controlled by a dowel pin similar to pin 62, but not shown.

The lower portion of the gear case 125 and the cover 126 defines a second lubricant chamber 79 in which gear lube may be carried and in which the lower part of the helical gear 64 may turn. Gear lube may be inserted into the chamber 79 through the access door or cover 75 and be both carried upwardly and centrifugally thrown by the gear 64.

A hydraulic or fluid motor 80 is supported on the outside of the gear case 125 adjacent to the spindle 29 so that its output shaft 81 is generally parallel to the spindle 29. Secured to the output shaft 81 in any convenient manner is a pinion 82 having helical gear teeth meshing with the teeth of the helical gear 64. In order to minimize the forces present on the bearings within the motor 80, one face of the pinion 82 is provided with an adaptor 83 having a bearingly supported portion 84 including a shoulder 85 in engagement with the inner race of a radial thrust bearing assembly 86, supported by the cover 126. The outer race of the bearing assembly 86 is clamped against a shoulder 87 by a bearing cover 88 secured to the cover 126 as by means of a plurality of screws 89. The adapter 83 is secured to the pinion 82 as by means of a plurality of screws 90 which are preferably safety wired to prevent loosening thereof. The shoulder 85 transmits axial forces produced by the helical gears 64 and 82 against the inner race, while the journalled portion 84 is secured to the gear case 125 such as by screws 91. The hydraulic motor 80 may be of conventional design, for example, one having a 3000 p.s.i. rating, and is suitably ported to receive a high pressure line, a return line, and a drain line.

Referring now to Figure 4, there is shown an enlarged view of the hydraulic source of rotational power 23. The power source 23 includes a base 100 which supports certain parts of the power source 23 presently to be described, and which also comprises a part thereof. Thus, the base 100 preferably comprises a hollow hydraulic fluid reservoir having a suction port 101, and a return port 102. The upper surface of the reservoir 100 supports a hydraulic pump 103, for example a constant displacement pump, having an inlet or suction port communicating by means of a tube 104 with the suction port 101 of the reservoir 100 and with the fluid in the tank. The pump 103 has a discharge port or outlet communicating with a high pressure fluid line 105, which communicates with the inlet to the hydraulic motor 80. The pump 103 is driven by an electric motor 106 which has an output shaft 107 coupled to the input shaft 108 of the hydraulic pump 103. The motor 106 is also supported by the upper surface of the reservoir 100. At either end of the reservoir 100, there is a wheel assembly 109 which rides on the track or way 26 which is preferably supported independently of the main bed 13 of the lathe 10. Therefore, the wheel assemblies 109 are preferably disposed centrally of the power source 23 so as to carry substantially its entire weight.

The power source 23 further includes a second and somewhat smaller motor and pump assembly 110 which is supported by a portion 111 of the reservoir 100 which portion overhangs the sump 15 of the lathe 10. The inlet to the motor and pump assembly 110 is provided with a strainer which is disposed beneath the surface of the coolant in the sump. The outlet to the motor-pump assembly 110 communicates with a heat exchanger 112 located within the reservoir 100 and in external contact with the fluid therein. The outlet to the heat exchanger 112 discharges as at a point indicated by the numeral 113 back into the sump. The outlet of the motor and pump assembly 110 also communicates with a line 114 leading to a plurality of nozzles carried by the follow rest 21 for discharging coolant onto the workpiece 20 adjacent to the point where the cut is being taken.

The source of power 23 is drivingly connected to the carriage 17 as at the pivotal connections 124. The pivotal connections 124 each comprise a pair of brackets 115 and 116 secured to the reservoir or to the carriage 17 by any convenient means such as welding or bolting, and a third bracket or ear 117, secured to the other of such carriage and reservoir. The brackets 115—117 are each provided with registering openings through which a pin 118 is received. Since the track 26 may be supported independently of the lathe bed 13, the pivotal connections 24 compensate for any variation in the relative disposition between the track 26 and the ways 14. The return line 120 receives fluid from the various drains and from the return port of the motor 80, returning such fluid to the reservoir 100 through the return port 102. Of course a set screw 118a may also be provided in one of the brackets 115—117 to prevent axial movement of the pin 118.

Referring now to Figure 5, the power source 23 is seen in elevation. From this view, it can be seen that it is preferable to dispose the reservoir 100 as close to the track 26 as is practicable, thereby keeping the center of gravity as low as possible. Since the reservoir 100 may not extend as high as the carriage 17, a vertically disposed plate 121 is secured to the side of the reservoir adjacent to the carriage 17. The plate 121 may be further reinforced by a pair of brackets 93 and 94 secured as by welding to both the reservoir 100 and the plate 121. The plate 121, if desired, may have an opening 121a and another opening 121b to provide clearance or access to the pump 103 and the motor 106 respectively.

As shown in this view, a strainer 95 may be provided communicating with the suction line and disposed adjacent to an access plate 119 for easy cleaning. As best seen in this view the wheel assembly 109 includes a wheel 109a rotatable and bearingly mounted on an axle 92 carried by a bracket 130 secured to the base or reservoir 100.

Referring now to Figure 6, the details of the brackets 93 and 94 may be seen more clearly as well as the details of the wheel assembly 109. The reservoir 100 may also be provided with a drain plug 131.

Referring now to Figure 7, there is shown a schematic diagram illustrating how the various parts are functionally related and controlled. Power is supplied to the electric motor 106 which rotates the pump 103 through shafts 107 and 108. Hydraulic fluid is then withdrawn by the pump 103 from the reservoir 100 through the strainer 95 and suction line 104. Fluid is discharged under pressure through the discharge line 105 which communicates with a valve 140 set to maintain a constant back pressure on the pump 103. Pressurized fluid then passes to the fluid motor 80 and from it to a valve 141 set to maintain a constant back pressure on the motor. The inlet pressures to the motor typically may vary between 750 and 2000 p.s.i. for light and heavy cuts respectively. The valve 141 communicates with the return line 120 to return the fluid to the reservoir 100. A manually actuated valve 142 communicates with the valve 140 to by-pass the pressurized fluid back to the return line 120 to the reservoir to stop operation of the motor 80. Of course, when no fluid is being bypassed through the valve 142, substantially the entire output of the pump 103 passes through the motor 80. One of the cables 28 may be an electric control cable.

A second one of the cables provides power, e.g. three phase alternating current to the motor 106. The smaller motor pump assembly 110 may be powered by the same source that powers the motor 106, and draws coolant from the sump 15 and directs it to the heat exchanger 112 within the reservoir 100 and thence back to the sump 15, and also directs coolant via line 114, such coolant being directed against the workpiece 20. The coolant drips directly from the workpiece into the sump 15.

The motor 80 drives the pinion 82 which is supported by the bearing assembly 86, and the pinion 82 in turn drives the larger gear 64 to rotate the spindle 29, and the cutter 72. One of the cables 28 may be a hose connected to a source of oil mist for direct lubrication of the cutting edges of the cutter 72.

In the diagram of Figure 7, it will be noted that the rotational axis of the cutter 72 is perpendicular to and offset from the rotational axis of the workpiece 20. The chord of the cutter outside diameter which is tangent to the circle of the inner ends of the cutter blades should engage the external horizontal centerline of the work and the rotational axis of the cutter should not be offset a lesser distance. By way of example, I have found that a three and one-half inch offset functions exceedingly well, regardless of the diameter of the workpiece 20, provided cutter diameter is no less than eight inches.

Accordingly, the workpiece 20 is rotatably driven from the first source of power, not shown in this diagram, during which time power is delivered from the pump 103 to the cutter 72; simultaneously therewith, the cutter is translated by the lead screw's advance of the carriage, with respect to the workpiece 20.

Further, it is particularly advantageous to keep the cutter power source remote from the main portion of the lathe, and to subject the various connections between the cutter and the pump to a minimum of flexing. Accordingly, it has been found preferable to translate the power source along with the carriage in a direction parallel to and adjacent the workpiece 20.

The use of a method and apparatus involving the delivery of rotational power direct to a rotary cutter which is in engagement with the rotating workpiece has produced some very dramatic and unexpected results. These results can be most easily understood and their superiority appreciated if considered with respect to a specific example which is presented for the purpose of illustration, and not intended to limit the scope of my invention in any way. When the workpiece is a roll 28 feet long and has a 24 inch diameter, and when the required operation has been the machining of the outer cylindrical surface of such cylinder to an acceptable surface finish, perimetral tolerances being held within .010 inch, it has heretofore required 30 machine hours to perform this operation using a conventional 15 horsepower 42 inch lathe. In performing the operation in 30 machine hours, it has been necessary to operate such conventional lathe at rated load capacity, to use a steady rest near the center of the workpiece, to take two passes approaching from the opopsite ends of the workpiece and to move the steady rest between such passes, to work out a resulting discontinuity at the juncture of such passes, and to use a straightening operation after the machining of the workpiece in order to correct warpage caused by stress relief due to the high temperatures produced during machining. A surface finish of 120 micro inches has resulted from the foregoing machining operation.

When the same operation, performed on an identical workpiece, was effected using the method and apparatus of the instant invention, over 80% of the machining time was eliminated, the use of a steady rest was eliminated, the excessive heating and subsequent stress relief and straightening operation were eliminated, and a surface finish of 60 microinches was produced on the workpiece. This was accomplished using a 15 horsepower electric motor as the motor 106 in the power source 23. In this example, a 24" diameter workpiece was rotated at 2.7 r.p.m. Thus, the work was fed at about 17 feet per minute. Feed is thus accomplished by the rotation of the workpiece, and not by the advance of the carriage as in conventional lathes. In this example, the carriage was advanced 1.25 inches per minute by the lead screw. The advance of the carriage by the lead screw determines the width of cut, it being about .4 inch in this example. Thus the width of cut is not determined by the shape and size of the cutter as it is in conventional lathes, nor is the cutting speed determined by the rotational speed of the workpiece. Where smaller diameter workpieces are machined, a proportionately higher rotational speed is needed to produce the above rate of feed.

By the elimination of the need for the steady rest, the pass can extend the entire length of the workpiece, even when hollow tubes having the dimensions above identified are machined, thereby further eliminating the need for the working out of the discontinuity caused by the juncture of the two passes.

This process and type of apparatus may be utilized to machine any diameter of a cylindrical device, and is particularly advantageous for machining rolls having diameters, by way of example, between 8 inches and 5 feet. Further, longer or shorter rolls may be machined than the roll used in the foregoing illustration. Still further, the machine time required for performing an operation of this type can be further reduced by using a motor 106 larger than 15 horsepower, for example, 50 horsepower. The use of a smaller motor than 15 horsepower is also advantageous when the results obtained are compared to those of a heretofore conventional lathe.

The remarkable decrease in machining time or remarkable increase in the rate of material removal produces an unexpected problem. Heretofore, it has been common practice to remove the chips from the sump manually. The high rate of metal chip production, which chips fall into the sump, causes the coolant in the sump to overflow. Accordingly, in a preferred form of this inventoin, it is desirable to use a chip conveyor (not shown) disposed beneath the workpiece for catching and removing the chips produced by this operation.

Although various minor modifications might be suggested by those versed in the art, it should be understood that I wish to embody within the scope of the patent warranted hereon all such embodiments as reasonably and properly come within the scope of my contribution to the art.

I claim as my invention:

1. In a lathe having means for supporting and rotating a metal workpiece, the lathe having a horizontally movable carriage including and supporting a cross slide thereon, the improvement for machining the workpiece comprising in combination therewith: a milling cutter adapted to cut metal and rotatably supported on the cross slide for rotation about a fixed axis perpendicular to the rotational axis of the workpiece and for cutting engagement with the workpiece; a motor movable with the cross slide and arranged to rotatably drive said milling cutter; a power converting means operatively connected to drive said motor; a single track disposed parallel to and spaced from the movable carriage; at least one wheel translatably supporting said power converting means on said track; and means drivingly and pivotally connecting said power converting means to the carriage for translation by the carriage; whereby upon advancement of said carriage parallel to the rotational axis of the workpiece, said power converting means is translated with said motor a like distance adjacent to the carriage.

2. In a lathe having means for supporting and rotating a metal workpiece, the lathe having a horizontally movable carriage including and supporting a cross slide thereon for movements only at right angles to the direction of carriage movement; the movable carriage being supported by at least one first horizontal way, the improvement for machining the workpiece comprising in combination therewith: a milling cutter adapted to cut metal and rotatably supported on the cross slide for rotation about a fixed axis perpendicular to the rotational axis of the workpiece and for cutting engagement with the workpiece; a hydraulic motor movable with the cross slide and arranged to rotatably drive said milling cutter; a source of hydraulic power fluidly connected to rotate said motor; a single way disposed generally parallel to the first horizontal way and supported independently therefrom; means engaging said second way for translatably supporting said source of hydraulic power thereon; and driving and pivoting means connecting said source of hydraulic power to the carriage for effecting translation thereby and therewith, said driving and pivoting means being operative to compensate for variations in the relative disposition of said first and second ways; whereby upon advancement of said carriage parallel to the workpiece, said source of hydraulic power is translated a like amount with the carriage.

3. In a lathe having means for supporting and rotating a metal workpiece, the lathe having a horizontally movable carriage including and supporting a cross slide thereon for movements only at right angles to the direction of carriage movement; the movable carriage being supported by at least one first horizontal way, the improvement for machining the workpiece comprising in combination therewith: a milling cutter adapted to cut metal and rotatably supported on the cross slide for rotation about a fixed axis perpendicular to the rotational axis of the workpiece and for cutting engagement with the workpiece; a hydraulic motor movable with the cross slide and arranged to rotatably drive said milling cutter; a source of hydraulic power fluidly connected to rotate said motor; a single second way disposed generally parallel to the first horizontal way and supported spacedly therefrom; a hydraulic fluid reservoir having at least one wheel disposed centrally thereof, said wheel engaging said second way and supporting said reservoir for translation thereon; said reservoir supporting and operatively comprising a portion of said source of hydraulic power for the cutter motor; and means drivingly and pivotally connecting said reservoir to the carriage for translation thereby, whereby upon advancement of said cutter parallel to the workpiece, said reservoir is translated a like amount with the carriage.

4. In a lathe having means for supporting and rotating a metal workpiece, the lathe having a bed and a horizontally movable carriage including and supporting a cross slide thereon for movements only at right angles to the direction of carriage movement, the movable carriage being supported by at least one first horizontal way on the bed, and means defining an open coolant sump in the bed extending substantially coextensively with the first horizontal way, the improvement for machining the workpiece comprising in combination therewith: a hydraulically rotatably driven milling cutter adapted to cut metal and rotatably supported on the cross slide for rotation about a fixed axis perpendicular to the rotational axis of the workpiece and for cutting engagement with the rotating workpiece; a hydraulic fluid reservoir having a heat exchanger disposed directly in the fluid therein; a source of hydraulic power carried by and including said reservoir and fluidly connected to said cutter for rotatably driving said cutter; a second way disposed parallel to the first horizontal way, supported spacedly from the bed and translatably supporting said reservoir; means drivingly connecting said reservoir to the carriage for translation thereby and therewith; a coolant pump secured to the exterior of said translatable reservoir in spaced relation to the bed and translatably communicating with coolant in the open coolant sump in the bed for withdrawing coolant therefrom; and means extending from said coolant pump for conducting coolant directly to the heat exchanger to cool all of the fluid disposed in said reservoir and also directly from said pump to the workpiece adjacent to said cutter.

5. In combination with a cutting lathe having a bed supporting a head stock and a tail stock, a tool advancing mechanism, and a tool carriage slidably mounted on the bed intermediate said stocks and driven therealong by said mechanism, the improvement of: hydraulically driven means supported on the lathe carriage and adapted to rotatably and drivingly support a rotary cutting tool, and a hydraulic power supply fluidly coupled to said driven means to effect tool rotation, said power supply being translatably and pivotally coupled to the carriage; and a single track disposed in laterally spaced relation along the length of the bed, independent thereof, and supporting said power supply for the tool; whereby said bed is substantially not subjected to the weight of said power supply for the tool.

References Cited in the file of this patent

UNITED STATES PATENTS

| | | |
|---|---|---|
| 659,868 | Hickel | Oct. 16, 1900 |
| 914,948 | Hannum | Mar. 9, 1909 |
| 959,140 | Hope | May 24, 1910 |
| 1,968,255 | Lewis et al. | July 31, 1934 |
| 2,034,221 | Armitage | Mar. 17, 1936 |
| 2,259,472 | Johnson | Oct. 21, 1941 |
| 2,384,225 | Wilson | Sept. 4, 1945 |
| 2,455,662 | Dyer | Dec. 7, 1948 |
| 2,622,372 | Moulden | Dec. 23, 1952 |
| 2,663,541 | Geen | Dec. 22, 1953 |
| 2,740,037 | Strachan | Mar. 27, 1956 |
| 2,749,979 | Prewett | June 12, 1956 |